United States Patent
Perkins

(10) Patent No.: US 11,580,325 B2
(45) Date of Patent: Feb. 14, 2023

(54) SYSTEMS AND METHODS FOR HYPER PARAMETER OPTIMIZATION FOR IMPROVED MACHINE LEARNING ENSEMBLES

(71) Applicant: Oath Inc., New York, NY (US)

(72) Inventor: Kevin Andrew Perkins, Champaign, IL (US)

(73) Assignee: YAHOO ASSETS LLC, Dulles, VA (US)

(*) Notice: Subject to any disclaimer, the term of this patent is extended or adjusted under 35 U.S.C. 154(b) by 1057 days.

(21) Appl. No.: 16/257,368

(22) Filed: Jan. 25, 2019

(65) Prior Publication Data

US 2020/0242400 A1 Jul. 30, 2020

(51) Int. Cl.
*G06K 9/62* (2022.01)
*G06N 20/20* (2019.01)

(52) U.S. Cl.
CPC ......... *G06K 9/6256* (2013.01); *G06K 9/6262* (2013.01); *G06N 20/20* (2019.01)

(58) Field of Classification Search
CPC ..... G06K 9/6256; G06K 9/6262; G06N 20/20
USPC .......................................................... 706/12
See application file for complete search history.

(56) References Cited

U.S. PATENT DOCUMENTS

2019/0095785 A1* 3/2019 Sarkar .................. G06N 3/08
2020/0202170 A1* 6/2020 Basu .................... G06N 7/005

* cited by examiner

*Primary Examiner* — Allen C Wong
(74) *Attorney, Agent, or Firm* — Cooper Legal Group LLC

(57) ABSTRACT

One or more computing devices, systems, and/or methods for hyper parameter optimization for machine learning ensemble generation are provided. For example, one or more base models are trained using diverse sets of hyper parameters, wherein different sets of hyper parameters (e.g., hyper parameters with different values) are used to train different base models. A matrix, populated with predictions from the set of base models, is generated. A machine learning ensemble is generated by processing the matrix utilizing a meta learner.

20 Claims, 5 Drawing Sheets

SYSTEMS AND METHODS FOR HYPER PARAMETER OPTIMIZATION FOR IMPROVED MACHINE LEARNING ENSEMBLES

BACKGROUND

Machine learning can be utilized to perform various types of tasks. For example, machine learning can be used for image recognition, video recognition, text recognition, generating recommendations, data security, fraud detection, online search, natural language processing, etc. A machine learning model is trained using a training data set of labeled data samples, such as where the machine learning model is trained with photos labeled as "photo of a car" and "photo not of a car." After training, the machine learning model can process other photos in order to predict whether such photos depict a car or not. There are various types of machine learning models, such as decision trees, support vector machines, k-nearest neighbors, random forests, linear regression, logistic regression, gradient boosting algorithms, etc.

Machine learning can be improved by using a machine learning ensemble. The machine learning ensemble comprises a collection of multiple machine learning models. Predictions by the machine learning models can be leveraged to make a single superior prediction that is more accurate. Unfortunately, a large amount of computing resources and time is required to train a machine learning ensemble because each individual machine learning model is individually trained.

SUMMARY

In accordance with the present disclosure, one or more computing devices and/or methods for hyper parameter optimization for machine learning ensemble generation are provided. One or more base models may be trained using a training data set (e.g., labeled training data). A hyper parameter is used to control how a base model operates (e.g., controlling the behavior of a machine learning model), such as a max depth hyper parameter or a minimum samples split hyper parameter for a decision tree. A base model is a machine learning model that will be trained using specific values for hyper parameters. Diverse hyper parameters may be used to train the one or more base models, such as where different base models are trained with hyper parameters having different values. In an example of training, a first value for a first hyper parameter is used to train a first base model. A second value, different than the first value, for the hyper parameter is used to train a second base model. The first base model and the second base model may be different types of machine learning models or the same machine learning model but with different values for hyper parameters of that machine learning model.

A matrix is generated based upon predictions made by the base models that were trained using the diverse sets of hyper parameters (e.g., different values for hyper parameters). The matrix may be generated based upon the base models processing a validation data set not yet processed by the base models and lacking labels. The matrix comprises rows representing sample data points in the validation data set and columns presenting base models (e.g., base models trained using various hyper parameter values). The matrix is populated with entries comprised of predictions by the base models for the validation data set.

A meta learner (e.g., a machine learning model such as a logistic regression machine learning model) is configured to process the matrix in order to generate the machine learning ensemble. The meta learner assigns weights to sets of hyper parameters based upon accuracy of predictions made using each set of hyper parameters. Feature selection may be performed to reduce a number of entries within the matrix, such as to remove hyper parameters with low weights (e.g., accuracies below an accuracy threshold). Once processed, the meta learner generates the machine learning ensemble using one or more trained base models, such as trained base models having accuracies above the accuracy threshold or a select number of trained base models having highest accuracies.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
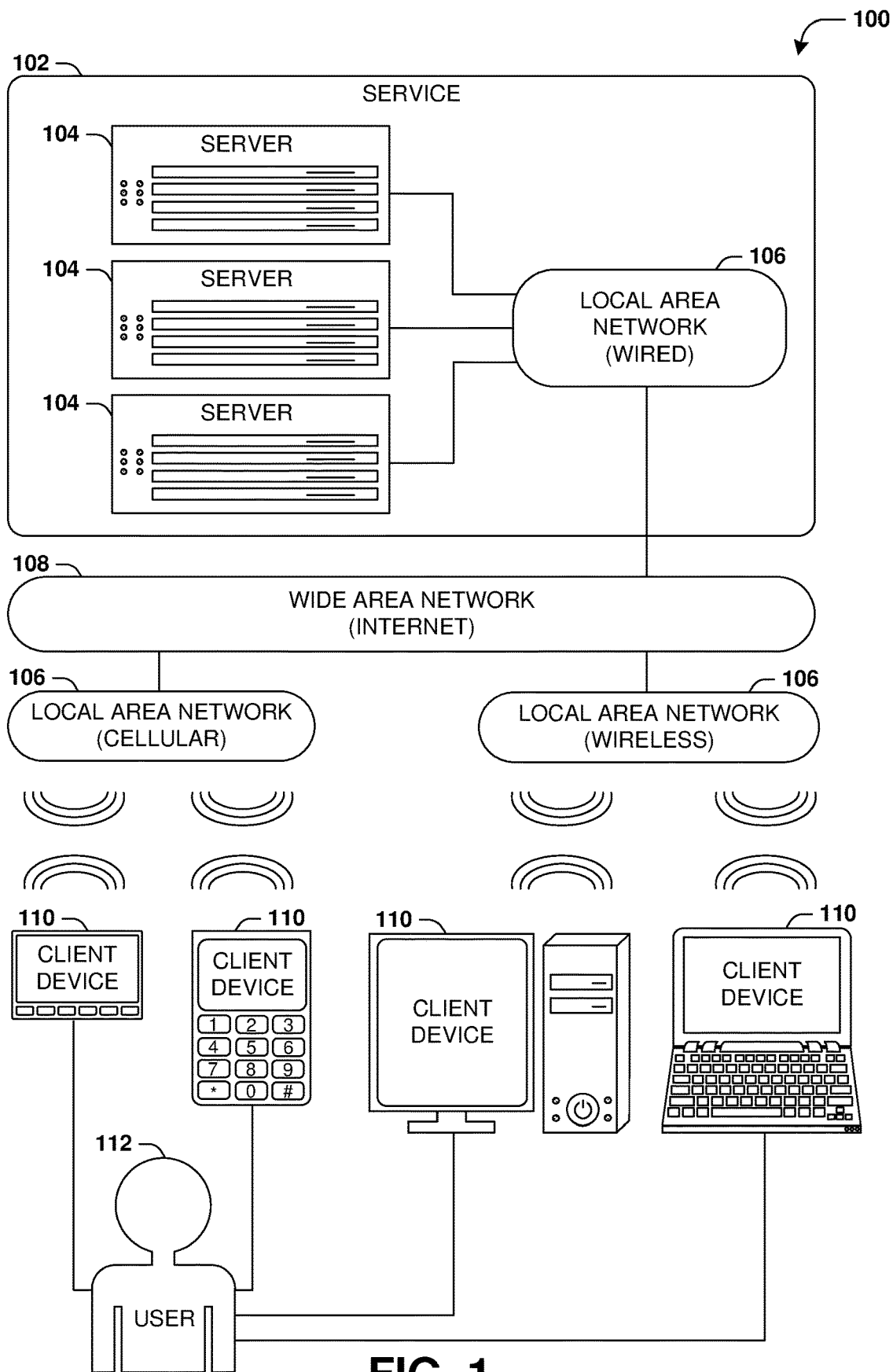
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
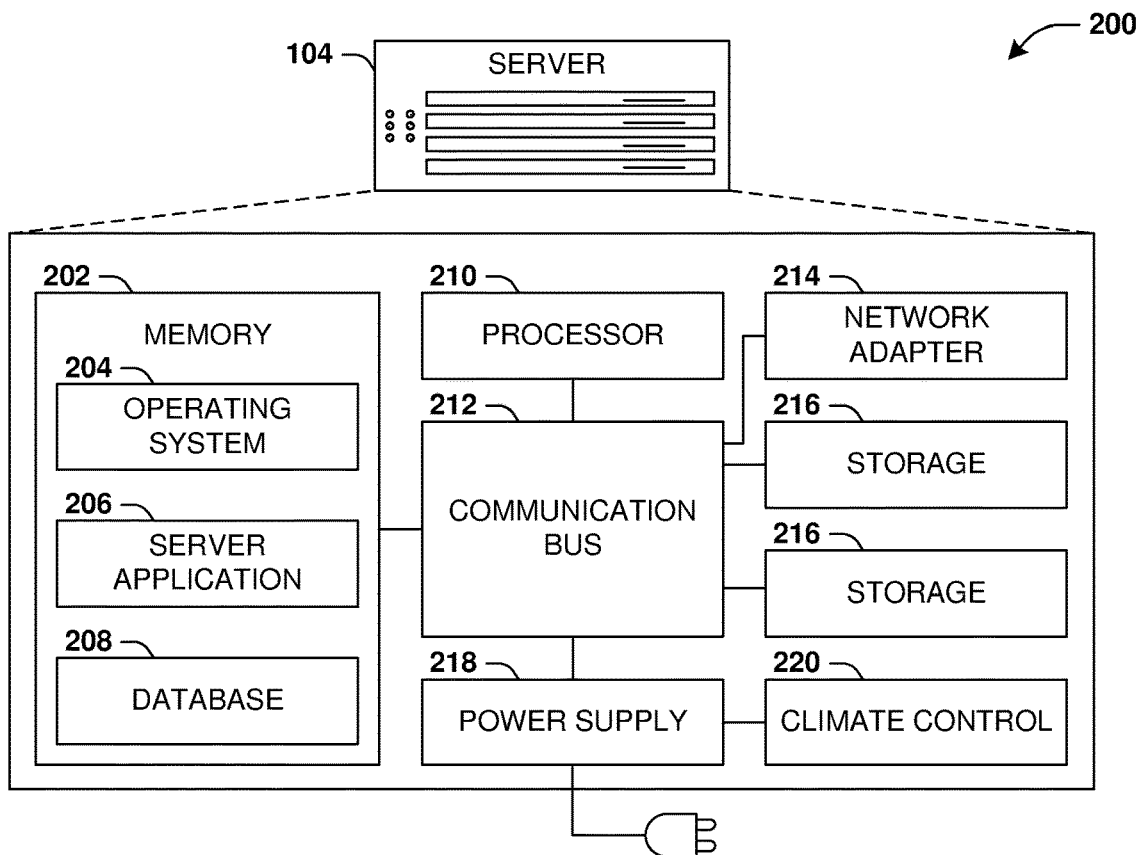
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
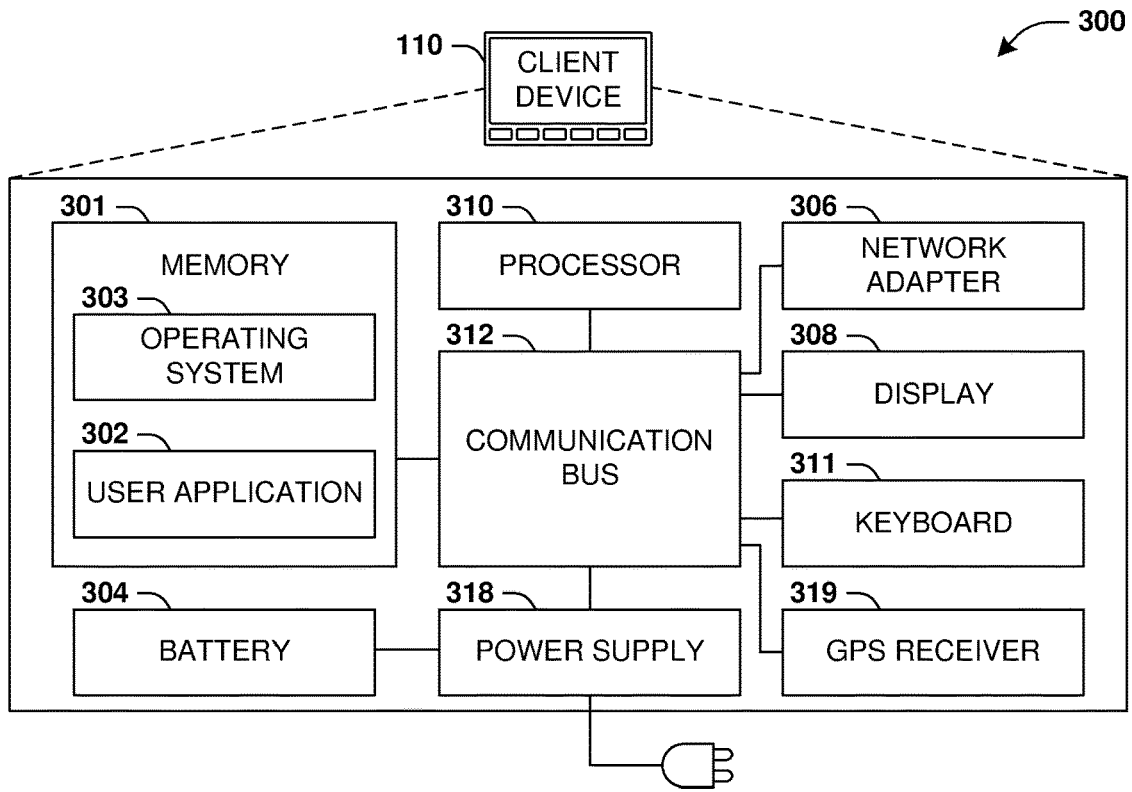
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for hyper parameter optimization for machine learning ensemble generation are provided. A machine learning model can be used to perform various tasks, such as recognizing entities within an image, classifying content, generating recommendations for a user, and/or a wide variety of other tasks. A machine learning model is generally trained using a labeled training data set. The labeled training data set comprises data that is labeled (e.g., a first image labeled as depicting a desk, a second image labeled as not depicting a desk, etc.) so that the machine learning model can use the labels and features of the data to learn how to perform a task, such as predicting whether other images depict desks or not. Once trained, a validation data set can be used to see how well the machine learning model was trained, such as to determine the accuracy and performance of the trained machine learning model. The validation data set does not comprise labels accessible to the machine learning model and has not been processed by the machine learning model. Accuracy of predictions made by the machine learning model upon the validation data set will indicate how accurate the machine learning model is due to being trained using the labeled training data set and values specified for hyper parameters of the machine learning model (e.g., how well the machine learning model was able to predict whether images depict a desk or do not depict a desk).

A machine learning ensemble may be generated from multiple machine learning models. The machine learning ensemble is able to generate more accurate predictions than a single machine learning model. Unfortunately, training time for a machine learning ensemble is very long and consumes a large amount of computing resources. Also, training uses the same hyper parameters for machine learning models (e.g., same values), which lowers the overall achievable accuracy of the resulting machine learning ensemble.

Accordingly, as provided herein, a machine learning ensemble is generated using one or more base models trained using diverse sets of hyper parameters (e.g., diverse sets of values for hyper parameters). Training time of the base models and the machine learning ensemble is reduced, along with accuracy of the machine learning ensemble being improved based upon hyper parameter optimization where diverse hyper parameters sets are used to train base models (machine learning models) and generate the final machine learning ensemble.

Figure 4:
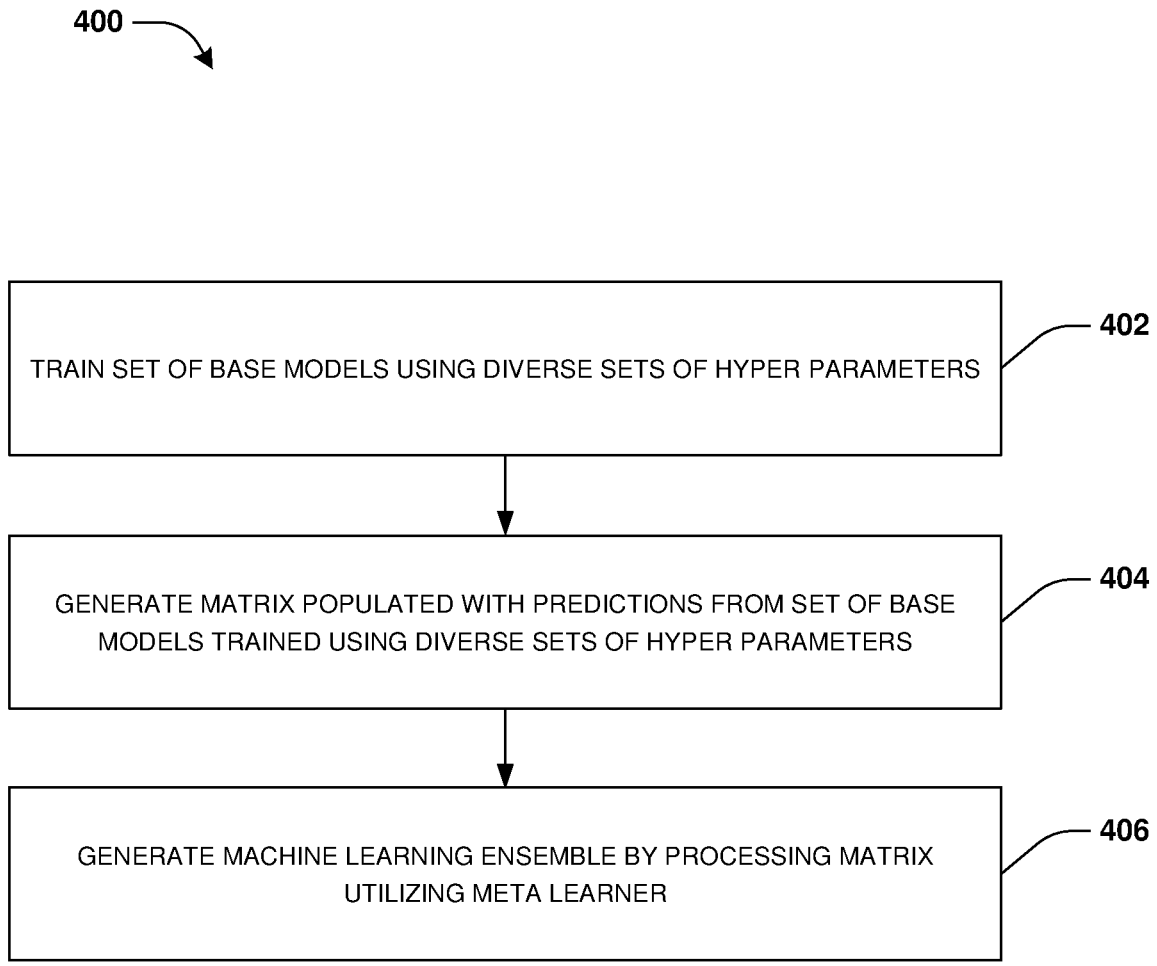
FIG. 4 is a flow chart illustrating an example method for hyper parameter optimization for machine learning ensemble generation.
Figure 5:
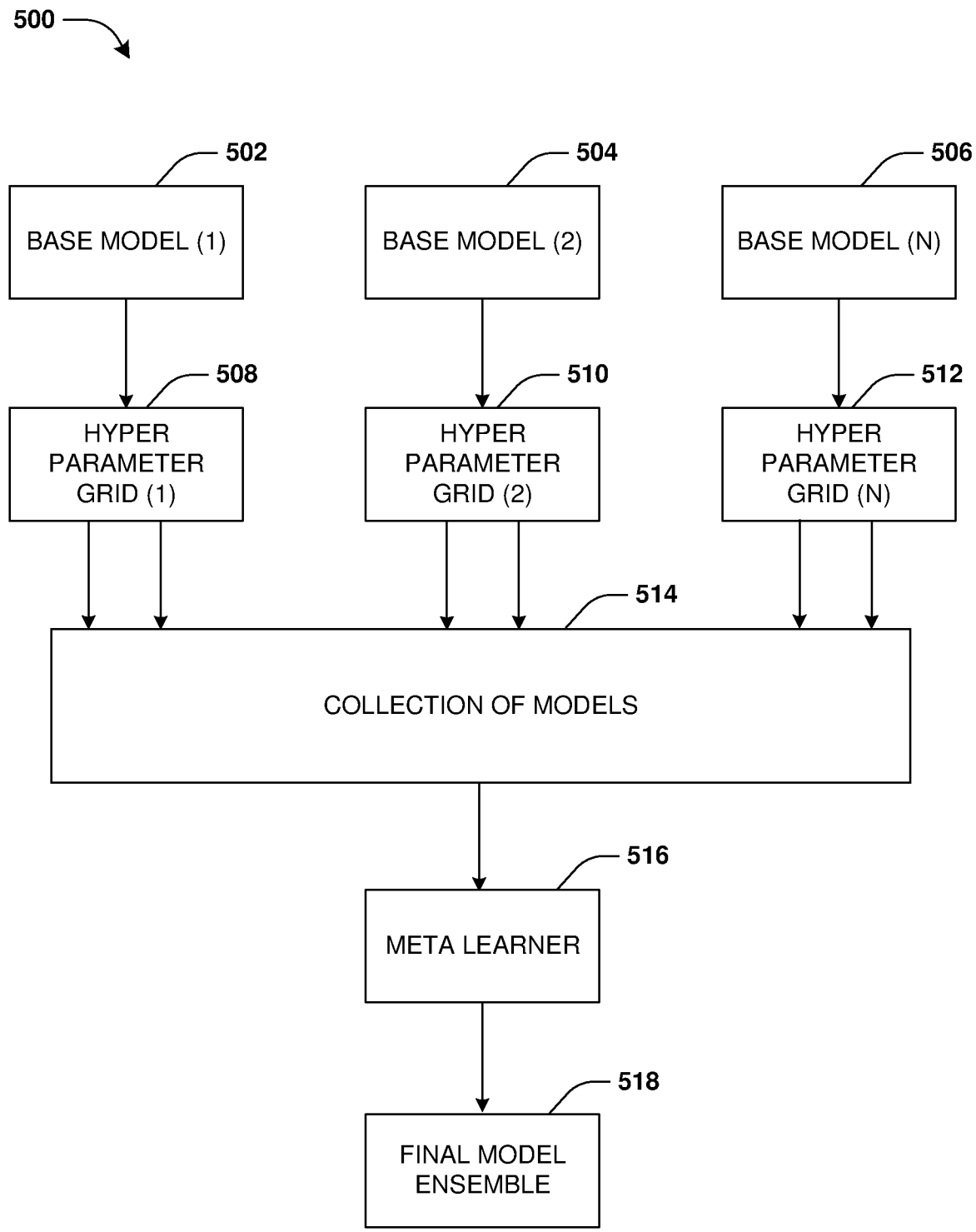
FIG. 5 is a component block diagram illustrating an example system for hyper parameter optimization for machine learning ensemble generation.

An embodiment of hyper parameter optimization for machine learning ensemble generation is illustrated by an example method 400 of FIG. 4, which is described in conjunction with system 500 of FIG. 5. At 402, one or more base models (e.g., a single base model or any number of base models of the same or different types of machine learning models) are trained using diverse sets of hyper parameters. That is, different base models are trained with different sets of hyper parameters, such as different values for hyper parameters (e.g., a first decision tree is trained with a first max depth hyper parameter value and a first min samples split hyper parameter value, while a second decision tree is trained with a second max depth hyper parameter value and a second min samples split hyper parameter value). The base models are trained using labeled training data. Using different values of hyper parameters for different models will improve accuracy, model diversity, and training time for generating the final machine learning ensemble.

In an embodiment, a first base model 502, a second base model 504, and/or other base models 506 of machine learning models/algorithms are trained using the diverse sets of hyper parameters, as illustrated by FIG. 5. The first base model 502 is trained using sets of hyper parameters. For example, a first set of hyper parameters comprises a first value for a first hyper parameter, a second value for a second hyper parameter, and a third value for a third hyper parameter. A second set of hyper parameters comprises a fourth value for the first hyper parameter, the second value for the second hyper parameter, and a fifth value for the third hyper parameter. In this way, different combinations of values for different hyper parameters are used in different sets of hyper parameters. In an example, all sets of hyper parameters comprise the same type of hyper parameters, but have different values for the hyper parameters.

In an embodiment, values for hyper parameters are randomly selected for training the first base model 502. The values may be randomly selected from a range of permissible values for the hyper parameters. For example, the first value, the second value, and the third value are selected for hyper parameters of the first set of hyper parameters. The fourth value, the second value, and the fifth value are selected for hyper parameters of the second set of hyper parameters. In this way, random values are selected for hyper parameters within sets of hyper parameters used to train the first base model 502.

In an embodiment, values for hyper parameters are chosen using a hyper parameter grid, such as a first hyper parameter grid 508 used to train the first base model 502, a second hyper parameter grid 510 used to train the second base model 504, and/or other hyper parameter girds 512 used to train other base models. The first hyper parameter grid 508 specifies combinations of values within ranges to apply to the first base model 502 for training. The first hyper parameter grid 508 can be searched in order to identify exhaustive combinations of different values to use for different hyper parameter values when training the first base model 502. In an example of a hyper parameter grid, there a base model may use two different hyper parameters, such as a first hyper parameter and a second hyper parameter. A range of values for the first hyper parameter may be values from 5 to 7. A range of values for the second hyper parameter may be values from 0 to 2. Thus, the hyper parameter grid may be used to identify all 9 combinations of hyper parameters and values. In this way, the hyper parameter grid can be searched to identify 9 different hyper parameter sets that can be used to individually train the base model.

Similarly, the second hyper parameter grid 510 is populated with values for hyper parameters used by the second base model 504. The second hyper parameter grid 510 can be searched to identify different hyper parameter sets of exhaustive combinations of values within permission ranges for hyper parameters used by the second base model 504.

In an embodiment, a number of samples within a data set to search is determined, such as a number of hyper parameter samples from within a range of values to randomly select or search from a hyper parameter grid for use in training.

Accordingly, sets of hyper parameters having different combinations of values identified from the first hyper parameter grid 508 (or randomly chosen values) are used to train the first base model 502 on the labeled training data. Sets of hyper parameters having different combinations of values identified from the second hyper parameter grid 510 (or randomly chosen values) are used to train the second base model 504 on the labeled training data. In this way, diverse sets of hyper parameters (different combinations of values of hyper parameters) are used to train one or more base models.

Once the base models are trained as a collection of models 514, the trained base models are used to process a validation data set of data not yet processed by the base models. This is done to gauge the performance and accuracy of the trained base models so that select base models will be used in generating the machine learning ensemble 518 (e.g., the first base model 502 with a particular set of values for hyper parameters used by the first base model 502, the second base model 504 with a particular set of values for hyper parameters used by the second base model 504, etc.). In an embodiment, each trained base model is evaluated based upon predictions created by the trained base models for the validation data set. Each trained base model corresponds to each base model individually trained on different hyper parameter values. For example, the first base model 502 trained using a first set of values for hyper parameters, the first base model 502 trained using a second set of values for hyper parameters, the first base model 502 trained using a third set of values for hyper parameters, etc. are all used to process the validation data set in order to determine which values of hyper parameters tune the first base model 502 to be more accurate and perform better. This is similarly done with the trained second base model 504 and/or other trained base models.

Predictions by the trained base models for the validation data set may be stored an entries within a matrix, at 404. The matrix may comprise rows representing sample data points in the validation data set processed by the trained base models. The matrix may comprise columns representing trained base models (e.g., the first base model 502 trained using a first set of hyper parameter values, the first base model 502 trained using a second set of hyper parameter values, the first base model 502 trained using a third set of hyper parameter values, the first base model 502 trained using other combinations of hyper parameter values, the second base model trained using various combinations of hyper parameter values, etc.). The matrix is populated with predictions that the trained base models made for the sample data points in the validation data set.

At 406, a meta learner 516 (e.g., a machine learning model/algorithm, such as logistic regression) processes the matrix in order to generate the machine learning ensemble 518. In an embodiment, the meta learner 516 assigns weights to each set of hyper parameters based upon the accuracy of predictions made using each set of hyper parameters. For example, a relatively lower weight will be applied to values of a set of hyper parameters based upon a model trained using the values of the set of hyper parameters making an incorrect prediction (e.g., predicting that an image depicts a desk when the image does not depict a desk). Similarly, a relatively higher weight will be applied to values of a set of hyper parameters based upon a model trained using the values of the set of hyper parameters making a correct predicting (e.g., predicting that the image does not depict the desk when the image does not actually depict the desk).

In an embodiment, the meta learner 516 performs feature selection to reduce a number of entries within the matrix that will be used to generate the machine learning ensemble 518. For example, recursive feature elimination is used for feature selection to eliminate predictions below an accuracy threshold (e.g., disqualify sets of parameters that were used to train base models that were inaccurate at creating correct predictions for the validation data set). This reduces time and computing resources otherwise used in generating the machine learning ensemble 518.

In an embodiment, the meta learner 516 (e.g., logistic regression or other stage 2 machine learning algorithm) determines a number of hyper parameters (trained base models) to include within the machine learning ensemble 518. In particular, a meta hyper parameter is defined for the meta learner 516. The meta hyper parameter corresponds to a number of estimators. The number of estimates relates to a maximum number of trained base models that are allowed to be included within the machine learning ensemble 518. The number of trained base models may be limited in order to avoid over fitting from too many trained base models being used. The meta learner 516 will create the machine learning ensemble 518, which is generated based upon diversely trained base models such that the machine learning ensemble 518 will have greater accuracy and performance than any single base model.

In an embodiment of generating a machine learning ensemble, a hyper parameter optimization function is provided. The hyper parameter optimization function takes input arguments, such as a training dataset (e.g., labeled data points used to train machine learning models), a validation dataset (e.g., data points used to validate machine learning models), a machine learning model type (e.g., decision trees, support vector machines, k-nearest neighbors, random forests, linear regression, logistic regression, gradient boosting algorithms, etc.), hyper parameter value ranges (e.g., a value range from 2-8 for a max depth hyper parameter, a value range of 3-5 for a minimum samples split hyper parameter, etc.), and/or a number of samples N1 to search (e.g., a number of hyper parameter samples to use for tuning and training a machine learning model). The hyper parameter optimization function returns a single hyper parameter within a hyper parameter value range that maximizes accuracy of the machine learning model.

The hyper parameter optimization function performs the steps of selecting N1 hyper parameter samples (a set of hyper parameter values) from inside the hyper parameter value range, such as at random. The hyper parameter optimization function trains N1 base models using the select hyper parameter samples (a set of hyper parameter values). The parameter optimization function returns the hyper parameter that optimizes validation performance of the trained base models generating predictions for a validation data set.

In an embodiment of generating a machine learning ensemble, a collective hyper parameter optimization function is provided. The collective hyper parameter optimization function takes input arguments, such as a training dataset (e.g., labeled data points used to train machine learning models), a validation dataset (e.g., data points used to validate machine learning models), a machine learning model type (e.g., decision trees, support vector machines, k-nearest neighbors, random forests, linear regression, logistic regression, gradient boosting algorithms, etc.), hyper parameter value ranges (e.g., a value range from 2-8 for a max depth hyper parameter, a value range of 3-5 for a minimum samples split hyper parameter, etc.), a number of samples N1 to search (e.g., a number of hyper parameter samples to use for tuning and training a machine learning model), a stage 2 machine learning model type (e.g., logistic regression as the meta learner), and a maximum number of hyper parameters to include in a final machine learning ensemble.

The collective hyper parameter optimization function returns a set of N2 hyper parameters within the hyper parameter value ranges. The collective hyper parameter optimization function also returns a set of N2 coefficients/weights. For example, the collective hyper parameter optimization function returns a list of hyper parameter values with accompany coefficients/weights which produce a weighted combination that is optimal on the validate data set.

The collective hyper parameter optimization function performs the steps of selecting N1 hyper parameter samples (a set of hyper parameter values) from inside the hyper parameter value range, such as at random. The collective hyper parameter optimization function trains N1 base models using the select hyper parameter samples (a set of hyper parameter values). The collective hyper parameter optimization function uses a stage 2 hyper parameter optimization function, which will be described in detail later, to select optimal values for N1 and N2. The collective hyper parameter optimization function computes a matrix, such as a validation matrix, into which predictions by the trained base models are stored on every validation sample (e.g., data points within the validation data set). The collective hyper parameter optimization function trains the stage 2 machine learning model (e.g., the meta learner such as a logistic regression machine learning model) with the matrix as features and stage 2 labels. The collective hyper parameter optimization function retrieves the selected hyper parameter sets and weights from the stage 2 machine learning model in order to generate the final machine learning ensemble.

The stage 2 hyper parameter optimization function takes input arguments, such as trained base models, a validation data set, and a second validation data set. The stage 2 hyper parameter optimization function returns an optimal number of hyper parameter values to search and use. The stage 2 hyper parameter optimization function also returns an optimal maximum number of hyper parameters to include within the final machine learning ensemble. A grid search is performed across N1 and N2 and trains stage two machine learning models on the validation data set. N1 and N2 that optimize performance on the second validation data set is returned.

Figure 6:
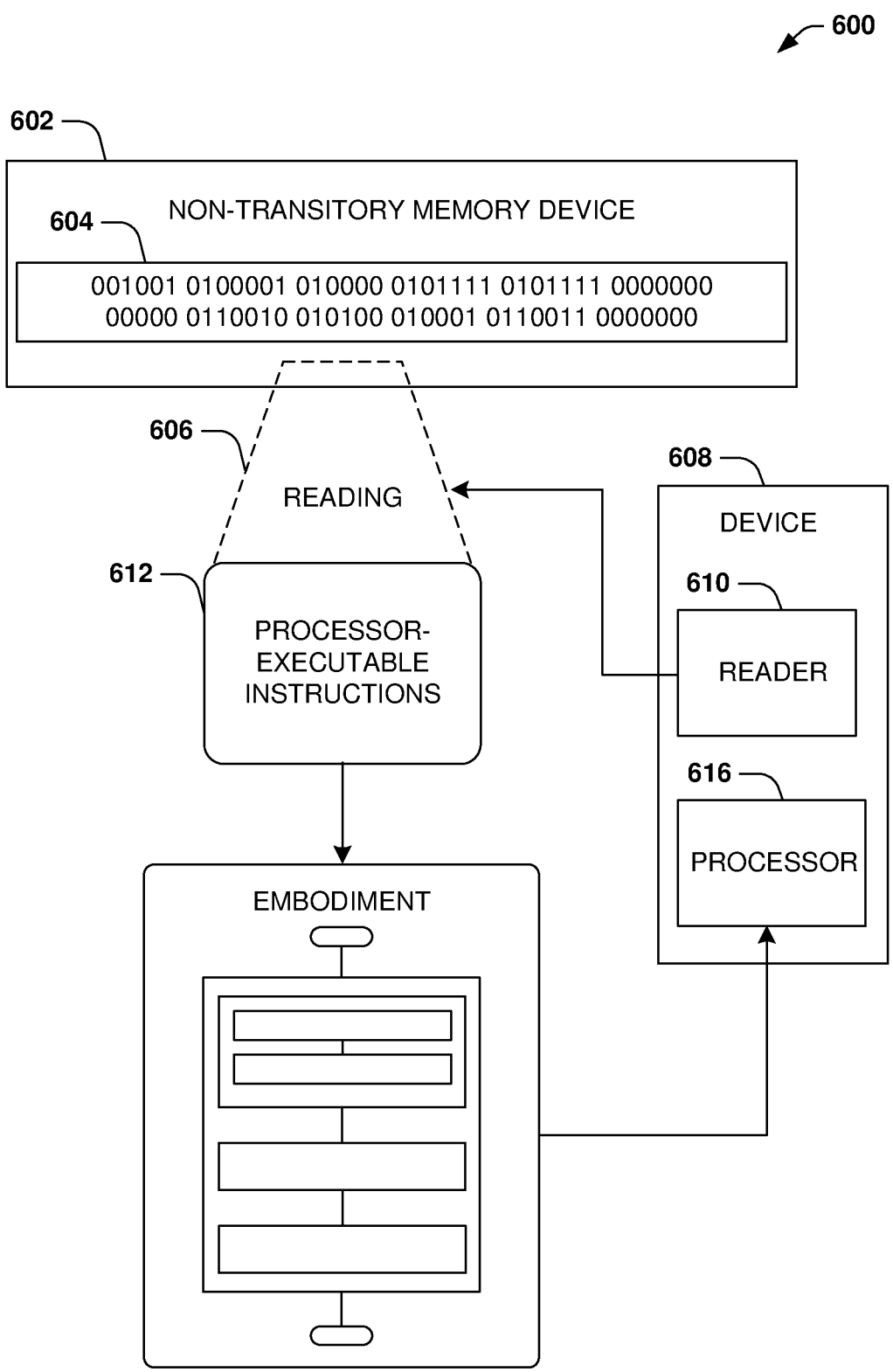
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
training a set of base models using diverse sets of hyper parameters, wherein different sets of hyper parameters are used to train different base models;
generating a matrix populated with predictions from the set of base models trained using the diverse sets of hyper parameters; and
generating a machine learning ensemble by processing the matrix utilizing a meta learner.

2. The method of claim 1, comprising:
generating a set of hyper parameter grids specifying ranges of hyper parameters to apply; and
utilizing different hyper parameter grids for training different base models.

3. The method of claim 1, wherein the training comprises:
applying a first value for a hyper parameter to a first base model and a second value, different than the first value, for the hyper parameter to a second base model.

4. The method of claim 1, wherein the matrix comprises rows representing sample data points in a validation set, columns representing base models, and entries representing predictions.

5. The method of claim 1, wherein the training comprises:
selecting random value for hyper parameters for training a base model.

6. The method of claim 1, comprising:
assigning weights to each set of hyper parameters based upon accuracy of predictions made using each set of hyper parameters.

7. The method of claim 1, wherein a value of a hyper parameter controls operation of a base model in generating a prediction based upon a train data set.

8. The method of claim 1, comprising:
performing feature selection to reduce a number of entries within the matrix processed by the meta learner to create a final model as the machine learning ensemble.

9. The method of claim 8, wherein the feature selection comprises recursive feature elimination that eliminates predictions below an accuracy threshold.

10. A computing device comprising:
a processor; and
memory comprising processor-executable instructions that when executed by the processor cause performance of operations, the operations comprising:
training a first base model using a first set of hyper parameters;
training a second base model using a second set of hyper parameters different than the first set of hyper parameters; and
generating a machine learning ensemble using a meta learner to process both predictions made by the first base model and predictions made by the second base model.

11. The computing device of claim 10, wherein the operations comprise:
randomly selecting values for hyper parameters within a parameter range as the first set of hyper parameters.

12. The computing device of claim 10, wherein the operations comprise:
randomly selecting values for hyper parameters within a parameter range as the second set of hyper parameters.

13. The computing device of claim 10, wherein the operations comprise:
assigning weights to each set of hyper parameters based upon accuracy of predictions made using each set of hyper parameters.

14. The computing device of claim 10, wherein the operations comprise:
determining a number of samples within a data set to search.

15. The computing device of claim 10, wherein the operations comprise:
determining a number of hyper parameters to include within a final model of the machine learning ensemble.

16. A non-transitory machine readable medium having stored thereon processor-executable instructions that when executed cause performance of operations, the operations comprising:
training a set of base models using a diverse sets of hyper parameters, wherein different sets of hyper parameters are used to train different base models; and
generating a machine learning ensemble using a meta learner to process both predictions made by a first base model of the set of base models and predictions made by a second base model of the set of base models.

17. The non-transitory machine readable medium of claim 16, wherein the operations comprise:
selecting random hyper parameters from a hyper parameter grid for training a base model.

18. The non-transitory machine readable medium of claim 16, wherein the operations comprise:
assigning weights to each set of hyper parameters based upon accuracy of predictions made using each set of hyper parameters.

19. The non-transitory machine readable medium of claim 16, wherein the operations comprise:
performing feature selection to reduce a number of entries within a matrix processed by the meta learner to create a final model as the machine learning ensemble.

20. The non-transitory machine readable medium of claim 16, wherein the operations comprise:
performing recursive feature elimination to reduce a number of features, corresponding to predictions made by the set of base models, processed by the meta learner.

* * * * *